United States Patent [19]

Bower

[11] Patent Number: 5,074,054
[45] Date of Patent: Dec. 24, 1991

[54] MACHINE SHOP TOOL AND ASSOCIATED METHOD FOR DETERMINING THE DEVIATION OF DIMENSIONS BETWEEN OBJECTS

[76] Inventor: Steven Bower, 547 Princess Dr., Elizabeth, Pa. 15037

[21] Appl. No.: 635,962

[22] Filed: Dec. 28, 1990

[51] Int. Cl.$^5$ .............................................. G01B 5/02
[52] U.S. Cl. ........................................ 33/795; 33/810
[58] Field of Search ................ 33/795, 796, 797, 792, 33/807, 811, 810, 821, 824, 823, 806, 556, 559, 501.06, 501.4, 501.6, 501.2, 679.1, 645, 646, 555.1, 783, 794

[56] References Cited

U.S. PATENT DOCUMENTS

| | | |
|---|---|---|
| 443,869 | 12/1890 | Riglander . |
| 1,065,744 | 6/1913 | Sutorik . |
| 1,606,475 | 11/1926 | Kute ........................................ 33/797 |
| 2,524,256 | 10/1950 | Greany ........................ 33/501.4 X |
| 2,805,481 | 9/1957 | Locke .................... 33/792 |
| 2,873,533 | 2/1959 | Wilson ............... 33/501.4 |
| 2,916,829 | 12/1959 | Clay ................................. 33/501.06 |
| 3,054,189 | 9/1962 | Coulson . |
| 3,104,470 | 9/1963 | Plante ............................. 33/501.06 |
| 3,376,649 | 4/1968 | Finley ................................. 33/795 |
| 4,291,465 | 9/1981 | Hemeyer . |

*Primary Examiner*—Harry N. Haroian
*Attorney, Agent, or Firm*—William A. Behare

[57] ABSTRACT

Apparatus and an associated method for determining the deviation of the distance between two points on a first object and the distance between two points on a second object. The apparatus and associated method are useful when measuring dimensions of short turn bores and O-ring grooves.

18 Claims, 5 Drawing Sheets

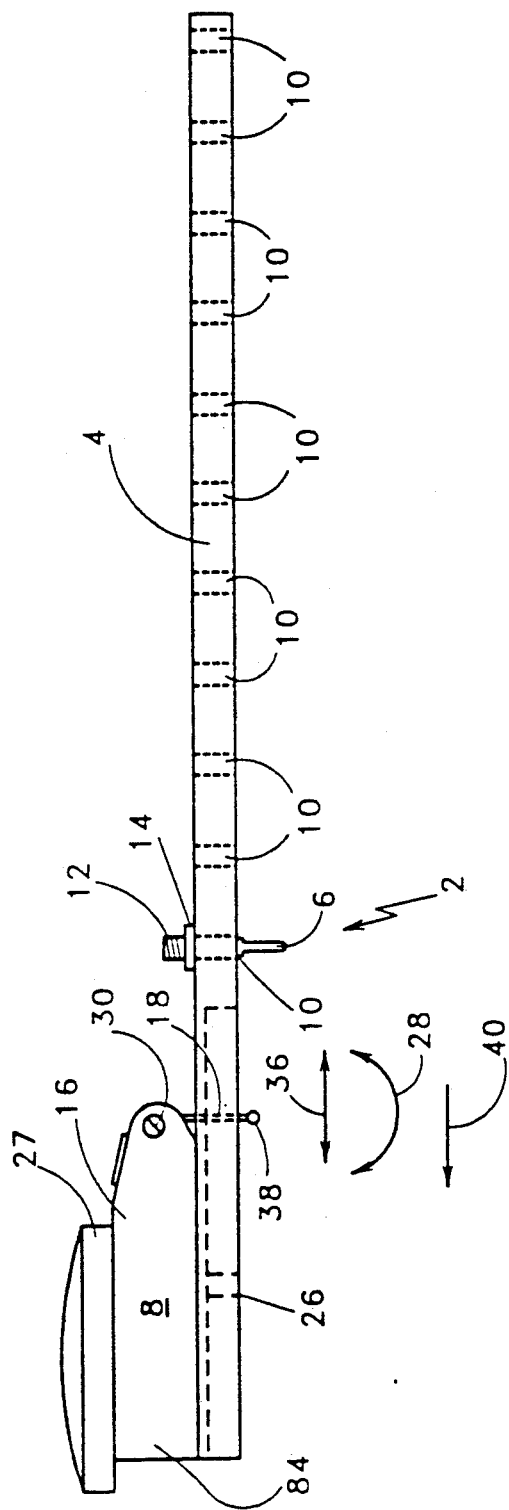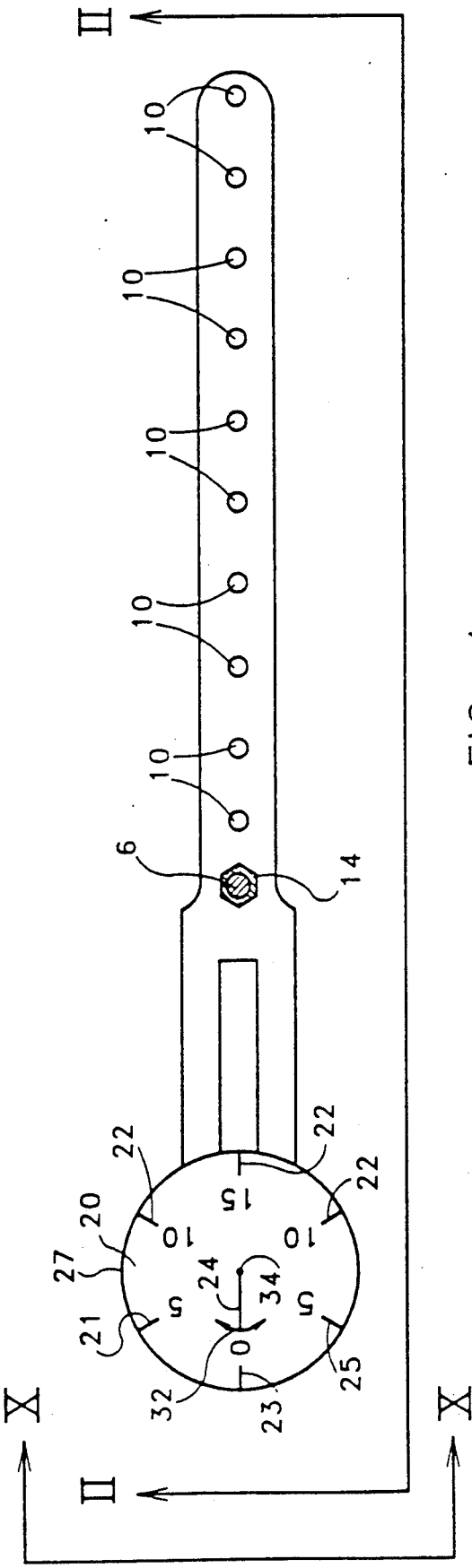

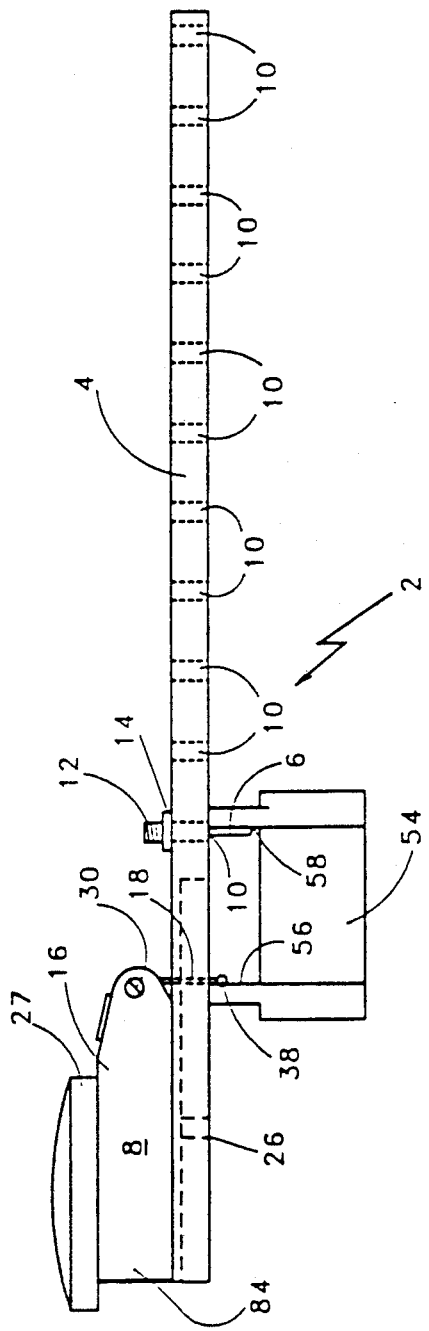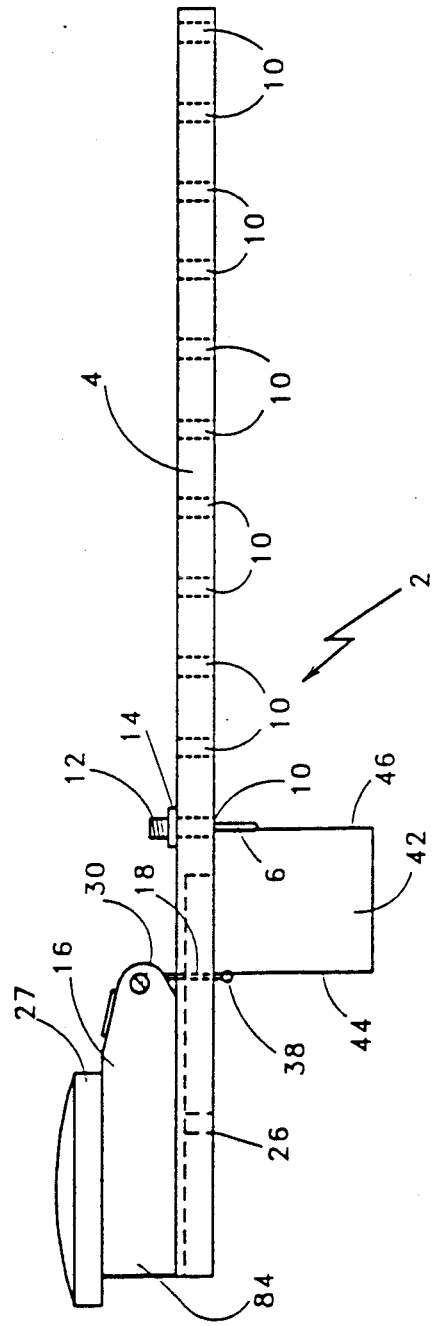

MACHINE SHOP TOOL AND ASSOCIATED METHOD FOR DETERMINING THE DEVIATION OF DIMENSIONS BETWEEN OBJECTS

BACKGROUND OF THE INVENTION

1. Field of the Invention

The present invention relates to a machine shop tool and associated method for determining the deviation of dimensions between objects and, more particularly, the deviation in length between two points on a reference object and two points on a workpiece.

2. Background Information

It is well known that some of the items manufactured by machine shops are precisely machined metal objects. Frequently, such metal objects must have dimensions that are machined to tolerances of several thousandths of an inch. It is necessary to have gauges that can measure such close tolerances to provide the required precision machining of the objects.

One common way of measuring tolerances is through the use of well known dial calipers. One drawback in using dial calipers, however, is that they are not capable of measuring shallow grooves, such as O-ring grooves, that may be as shallow as 0.020 of an inch and as narrow as 0.050 of an inch, or short turn bores that may be as shallow as 0.020 of an inch, that are machined in metal workpieces. That is because the anvils of the dial calipers that must be physically positioned within the O-ring groove or short turn bore are too large to fit within the groove or bore. Therefore, if a dimension of an object cannot be measured with dial calipers, the dimension must be measured with some other device that is capable of taking the measurement, such a well known height set machine. However, since height set machines are not readily portable, the workpiece must be transported from the work location to the height set machine for the measurement.

Other known devices, for measuring precise tolerances of dimensions include micrometers and telescoping bore gauges. These devices, likewise, are not capable of measuring shallow grooves or short turn bores because of the large dimensions of members that must fit within the groove or bore.

Further, most of these gauges provide only absolute readouts of the actual distance between two points on an object and cannot provide a direct readout that is a comparison of the relative distance between a pair of points on each of two different objects. Such comparison measuring is extremely useful if a particular object is machined, through trial and error, to a particular shape having acceptable dimensions and that object is then to be used a reference for reproducing similar objects, or workpieces, with the same dimensions. Also, such comparison measuring is useful if the distance between two points on a workpiece is to be compared with a standard reference distance, such as the distance between two points on a standard gauge block. A number of devices have been proposed for measuring absolute distances between two points on objects.

U.S. Pat. No. 443,869 discloses a micrometer gauge having a body member with a fixed stop and a ruler-like slideable member having movable stop that moves with the slide. The slide includes a plurality of markings that are representative of the distance between the movable stop and the fixed stop. Also included is a dial with a needle that rotates one complete turn for each unit of distance that the slide is moved out from the body member. The dial has a plurality of markings that correspond to fractions of units on the slide. When the slide is slid relative to the body member, the slide indicates the number of integral units of lengths between the fixed stop and the movable stop while the dial indicates the additional fractional units of length between the fixed stop and the movable stop. In use, the fixed stop and the movable stop are positioned against two points on the object to be measured. The length between the two points may then be determined by adding the integral number of units of length shown on the sliding scale to the fractional portions of a unit shown in the rotating indicator. This gauge is for measuring absolute distances and not for directly comparing one distance to another. Also, the stops are of such a relatively large size that they cannot be positioned in small areas such as is necessary when measuring an O-ring groove or a short turn bore.

U.S. Pat. No. 1,065,744 discloses a micrometer gauge having a movable stop, a fixed stop, a dial having a rotatable indicator and a worm gear for rotating the indicator and moving the movable stop relative to the fixed stop. Two points on an object to be measured are positioned, respectively, adjacent the movable stop and the fixed stop. The worm gear is then rotated until the movable stop and the fixed stop come in contact with the two points on the object. The worm gear also rotates the indicator to a position on the dial that corresponds to the distance between the two points. Again, this gauge provides only an absolute measurement of the distance between two points on an object rather than a direct comparison between the lengths of two different objects. Also, the stops are of such a relatively large size that they cannot be positioned in small areas such as is necessary when measuring an O-ring groove or a short turn bore.

U.S. Pat. No. 3,054,189 discloses an adapter for a dial indicator gauge. The adaptor includes apparatus for holding a standard dial indicator in a fixed position relative to a stop member. A movable arm, of the indicator, is positioned against a movable member that supports a movable stop. The movable and fixed stops are placed against two points on an object to be measured. Movement of the movable stop, when it is placed in contact with the object, moves the arm of the indicator which, in turn, causes the dial to display the distance between the two points on the object. Again, this device makes absolute measurements of distance between points on objects rather than a comparison of the relative distances between pairs of points on two different objects. Also, the stops are of such a relatively large size that they cannot be positioned in small areas such as is necessary when measuring an O-ring groove or short turn bore.

U.S. Pat. No. 4,291,465 discloses a caliper rule device having an extended measurement range. The device includes a body member and a sliding member that is attached to a dial scale. The sliding member has a movable stop while the body member has a fixed stop that may be positioned in any one of a plurality of fixed locations on the body member. The fixed locations on the body member are separated by predetermined units of length. The fixed and movable stop are placed, respectively, in contact with two points on an object between which a distance is to be measured. The distance is then equal to the sum of the reading on the dial and the distance between the end of the body member that is adjacent the sliding member and the fixed stop. Again, this device is for measuring absolute distances and not for comparing dimensions between two different objects. Also, the stops are of such a relatively large size that they cannot be positioned in small areas such as is necessary when measuring an O-ring groove or a short turn bore.

Therefore, a need exists for a gauge that is capable of providing an indication of a comparison of the distance between two points on one object, such as a reference object, and the distance between two points on a second object, such as a workpiece. Further, a need exists for a gauge that is dimensioned so that it can be employed when measuring shallow grooves, such as an O-ring groove, or a short turn bore. Additionally, a need exists for a gauge that is readily portable and can be easily transported to and used at a workstation. The present invention provides a solution to these needs.

SUMMARY OF THE INVENTION

One aspect of the invention resides broadly in an apparatus for providing a comparison of the distance between two points on a reference object with the distance between two points on a workpiece. The apparatus includes a base defining an axis, a stop connected to the base and a gauge connected to the base which has a lever movable toward and away from the stop, thereby defining a changeable distance therebetween. The gauge also has an indicator connected to the lever that moves in response to movement of the lever to a position relative to the axis of the base corresponding to the distance between the lever and the stop and a scale with indices thereon that is movable relative to the indicator to a preselected position. The lever is positioned a reference distance from the stop when the lever is moved to a first point on the reference object and the stop is positioned at a second point on the reference object, thereby moving the indicator to a reference position relative to the axis of the base. The scale is moved to position a reference index of the indices adjacent the indicator when the indicator assumes the reference position. The lever is positioned a comparison distance from the stop when the lever is moved to a first point on the workpiece and the stop is positioned at a second point on the workpiece, thereby moving the indicator relative to the axis of the base adjacent a comparison index of the indices when the lever is positioned a comparison distance from the stop where a comparison of the comparison index to the reference index provides an indication of the existence of a deviation between the reference distance and the comparison distance.

Another aspect of the invention resides broadly in an apparatus for determining the deviation of the distance between two points on a first object and the distance between two points on a second object. The apparatus includes a measuring device for measuring the distance between two points on an object having an indicator that moves relative to the distance between two points on an object when the object is measured and a scale with indices thereon that is movable relative to the indicator to a preselected position. The distance between the two points on the first object is measured by the measuring device to move the indicator relative to the distance between the two points on the first object. The scale is moved to position a reference index of the indices adjacent the indicator when the distance between the two points on the first object is measured by the measuring device. The distance between the two points on the second object is measured by the measuring device to move the indicator adjacent a comparison index on the scale relative to the distance between the two points on the second object where a comparison of the comparison index to the reference index provides an indication of the existence of a deviation of the distance between the two points on the first object and the distance between the two points on the second object.

Yet another aspect of the invention resides broadly in a method for determining the deviation of the distance between two points on a first object and the distance between the two points on a second object. The method includes the steps of measuring the distance between the two points on the first object with a measuring device to move an indicator relative to the distance between the two points on the first object. Moving a scale having indices thereon to position a reference index of the indices adjacent the indicator when the distance between the two points on the first object is measured by the measuring device. Measuring the distance between the two points on the second object with the measuring device to move the indicator adjacent a comparison index on the scale relative to the distance between the two points on the second object where a comparison of the comparison index to the reference index provides an indication of the existence of a deviation of the distance between the two points on the first object and the two points on the second object.

BRIEF DESCRIPTION OF THE DRAWINGS

The present invention may be better understood when taken in conjunction with the appended drawings in which:

FIG. 1 is a front elevational view of the present invention;

FIG. 2 is a side elevational view of the present invention, taken along line II—II of FIG. 1;

FIG. 3 is a side elevational view of the present invention positioned to measure an outer dimension of a reference object;

FIG. 5 is a side elevational view of the present invention positioned to measure an inner dimension of a reference object;

DESCRIPTION OF THE PREFERRED EMBODIMENT

Figure 6:
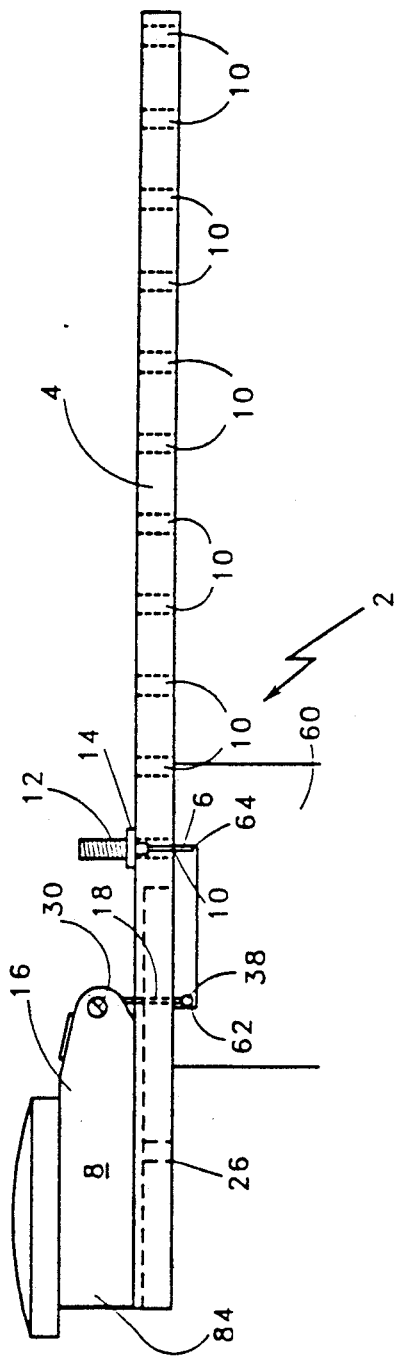
FIG. 6 is a side elevational view of the present invention positioned on an inner surface of an object having a dimension that is to be compared with the dimension of the reference object of FIG. 5.

FIGS. 1 and 2 show measuring device 2 which includes base 4, stop 6 and gauge 8. Base 4 includes a plurality of threaded holes 10 that include threads (not shown) that cooperate with threads 12, of stop 6, to connect stop 6 to base 4. Nut 14 is provided to lock stop 6 to base 4. Although stop 6 is configured to be received in any one of holes 10, the particular hole 10 selected is based on the size of the object being measured as explained below.

Gauge 8 includes housing 16, lever 18, scale 20, indices 21-23 and 25, indicator 24, screw 26 and rotating disk 27. Lever 18 pivots along arc 28 about pivot point 30 to rotate indicator 24 about arc 32. Scale 20 is mounted on rotating disk 27, which facilitates the rotation of scale 20 about pivot point 34. Rotating disk 27 may rotate scale 20 so that indicator 24 may point to any one of indices 21, 22, 23 and 25 as desired. Screw 26 connects gauge 8 to base 4.

Gauge 8 may be a standard, well known gauge manufactured by Brown & Sharp and identified by the mark "BESTEST." Lever 18, of gauge 8, is spring biased in both directions of travel along arc 28 so that it returns to its neutral, or spring biased, position as shown in FIG. 2 when not physically moved from that position.

Gauge 8 translates linear movement of tip 38 of lever 18, along either direction of arrow 36, into a corresponding rotation of indicator 24, relative to scale 20, to display the linear distance that tip 18 has moved from its neutral position. In the embodiment of the invention shown in the drawing figures, the distance between adjacent indices represent a distance of $5 \times 10^{-3}$ inches of liner movement of tip 38 of lever 18.

As an example, if lever 18 is in its neutral, spring biased position, as shown in FIG. 2 and scale 20 is rotated, by disk 27, so that indicator 24 points to "zero" index 23 if tip 38 of lever 18 were then moved linearly in the direction of arrow 40 by $5 \times 10^{-3}$ inches, indicator 24 would rotate in a clockwise direction and point to index 21, which corresponds to $5 \times 10^{3}$ inches of movement of tip 38 in the direction of arrow 40. If, on the other hand, tip 38 of lever 18 were linearly moved in the direction opposite arrow 40 by $5 \times 10^{-3}$ inches, then indicator 24 would rotate in a counter-clockwise direction and point to index 25, which corresponds to $5 \times 10^{-3}$ inches of movement of tip 38 in the direction opposite arrow 40.

Thus, measuring device 2 can provide an absolute indication of the linear distance that tip 38 of lever 18 is moved from its neutral position if disk 27 was rotated so that indicator 24 pointed to "zero" index 23 when lever 18 was initially in its neutral position. However, the present invention is especially useful when employed to compare the distance between one pair of points on one object with the distance between a second pair of points on the same or a second object.

Figure 4:
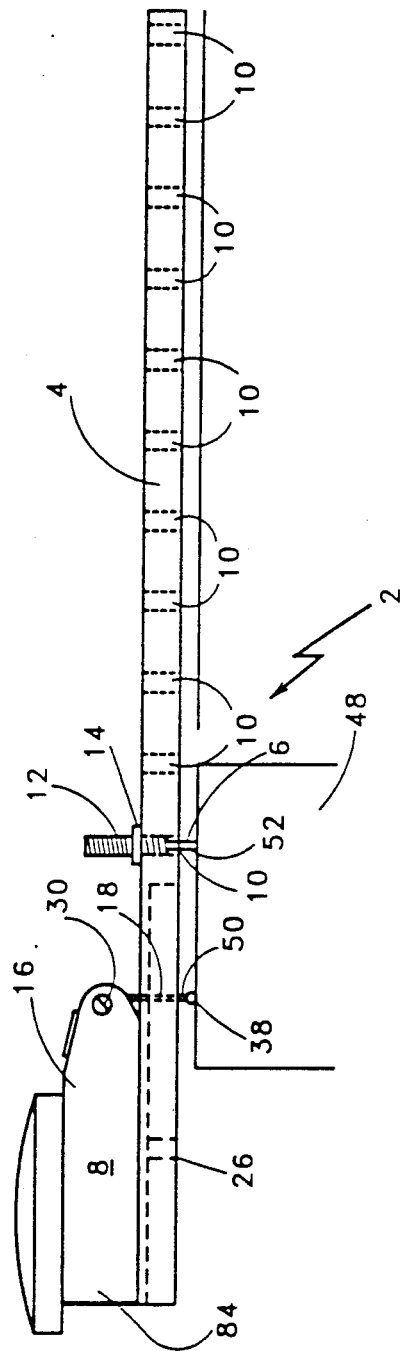
FIG. 4 is a side elevational view of the present invention positioned on an outer surface of an object having a dimension that is to be compared with the dimension of the reference object of FIG. 3.

FIGS. 3-7 illustrate the various methods of using measuring device 2 for such comparison measuring. FIGS. 3 and 4 illustrate the use of measuring device 2 when employed to compare the outer dimensions of two objects. As shown in FIG. 3, object 42 is employed to provide a reference distance between surfaces 44 and 46, which will be compared with the distance between two other surfaces, or points, on another object.

Object 42 may be any object that can provide a reference distance between two surfaces, such as surfaces 44 and 46. For example, object 42 may be a precision machined object that has, experimentally, been found to have dimensions that provide acceptable results when employed for its intended purpose. Therefore, it may be desirable to reproduce additional objects with the same dimensions as those of object 42.

Also, object 42 may be a well known standard gauge block, such as a Johansson gauge block that is manufactured by Brown & Sharp. Johansson gauge blocks are well known in the machinists trade for providing accurate reference distances between two surfaces to an accuracy of about $10^{-6}$ inches Johansson gauge blocks are provided in kit form and include a plurality of gauge blocks that are, each, marked with the distance between two surfaces on the block. An individual Johansson gauge block may be employed as a reference distance when one of the blocks in the kit has the exact desired reference distance between two surfaces. If, however, no single block has the desired distance between two surfaces, two or more blocks may be stacked together to achieve the desired distance between two surfaces of the stack.

Irrespective of whether the desired reference distance is provided by a standard gauge block or another reference object, object 42 having a known, desired distance between surfaces 44 and 46, is positioned adjacent measuring device 2, as shown in FIG. 3 with surface 46 in contact with stop 6 of device 2, and surface 44 in contact with tip 38 of lever 18 of device 2. Indicator 24 will then assume some reference position relative to scale 20. Since object 42 is employed to provide a reference distance against which other actual distances will be compared, disk 27 is then employed to rotate scale 20 so that indicator 24 points to "zero" index 23, which functions as a reference index. Measuring device 2 is now calibrated for comparison measuring with another object or workpiece, such as object 48 of FIG. 4.

When object 42 is then removed from measuring device 2, indicator 24 will rotate back to its initial position since lever 18 is spring biased and will return to its neutral position. However, scale 20 will remain in the same position to where it was rotated during calibration since disk 27 must be manually rotated to change the position of scale 20. Therefore, anytime tip 38 of lever 18 is spaced apart from stop 6 the same distance as the distance between surfaces 44 and 46, indicator 24 will point to "zero" index 23, as long as scale 20 remains in its calibrated position. Further, anytime tip 38 of lever 18 is spaced apart from stop 6 some distance other than the distance between surfaces 44 and 46, indicator 24 will point to the index corresponding to the deviation in the distances between the surfaces of the objects. Of course, since scale 20 is an analog scale, indicator 24 may point to a location on scale 20 that is intermediate two adjacent indices. Of course, in that case, an estimate of the numerical readout of scale 20 may be made using well known techniques.

Once the calibration of measuring device 2 is performed as described above, tip 38 of lever 18 is positioned in contact with one surface of the object to be compared with the reference object. In this example, tip 38 of lever 18 is positioned in contact with surface 50 of object 48 and stop 6 is positioned in contact with surface 52 of object 48, as shown in FIG. 4. Linear movement of tip 38, when tip 38 is moved to be positioned in contact with surface 50 of object 48 as shown in FIG. 4, causes indicator 24 to rotate to a comparison position corresponding to the amount of linear movement of tip 38 of lever 18 from the neutral position of lever 18. Since scale 20 has been calibrated to point to "zero" index 23 when the distance between tip 38 and stop 6 is equal to the calibrated reference distance, indicator 24 and scale 20 cooperate to provide a readout of the deviation in distance between surfaces 50 and 52 of object 48 from the distance between surfaces 44 and 46 of object 42.

If the distance between surfaces 50 and 52 of object 48 is less than the distance between surfaces 44 and 46 of object 42, indicator 24 will be rotated counter-clockwise from "zero" index 23 and point to the comparison index corresponding to the deviation in distance between surfaces 50 and 52 from that of surfaces 44 and 46. If the distance between surfaces 50 and 52 is greater than the distance between surfaces 44 and 46, indicator 24 will be rotated clockwise from "zero" index 23 and point to the comparison index corresponding to the deviation in distance between surfaces 50 and 52 from that of surfaces 44 and 46. Finally, if the distance between surfaces 50 and 52 is equal the distance between surfaces 44 and 46, indicator 24 will point to reference, "zero" index 23.

Since the indices of scale 20 represent known distances of separation between tip 38 and stop 6, the actual deviation in distances between pairs of surfaces on two objects may be directly read from scale 20. Measuring device 2 is designed to measure very small deviations and, therefore, may have indices corresponding to distances as small as $5 \times 10^{-4}$ inches or $5 \times 10^{-5}$ inches.

FIGS. 5 and 6 show how measuring device 2 may be employed to compare the inner dimensions between two objects; objects 54 and 60. As shown in FIG. 5, surface 56 of object 54 is positioned in contact with tip 38 and surface 58 of object 54 is placed in contact with stop 6. Object 54, thus, is being employed as a reference object to calibrate measuring device 2.

With reference object 54 positioned in contact with measuring device 2 as described above, indicator 24 will then rotate to assume a reference position relative to scale 20. Disk 27 is then employed to rotate scale 20 so that indicator 24 points to "zero" index 23 thereby calibrating measuring device 2. Object 60, which may be a workpiece, is then positioned with tip 38 in contact with surface 62, and stop 6, in contact with surface 64, as shown in FIG. 6. If the distance between surfaces 62 and 64 of object 60 is greater than the distance between surfaces 56 and 58 of reference object 54, indicator 24 will be rotated clockwise from the reference position and point to one of indices 21 and 22 that corresponds to the deviation in distance between surfaces 56 and 58 of object 54, and surfaces 62 and 64 of object 60. If the distance between surfaces 62 and 64 is less than the distance between surfaces 56 and 58, indicator 24 will be rotated counterclockwise from the reference position and point to one of indices 22 and 25 that corresponds to the deviation in distance between surfaces 56 and 58, of object 54, and surfaces 62 and 64 of object 60. If the distance between surfaces 62 and 64 is equal to the distance between surface 56 and 58, indicator 24 will point to "zero" indice 23. Thus, measuring device 2 may be employed to display the deviation of the inner diameter of one object from that of another, reference object.

Figure 7:
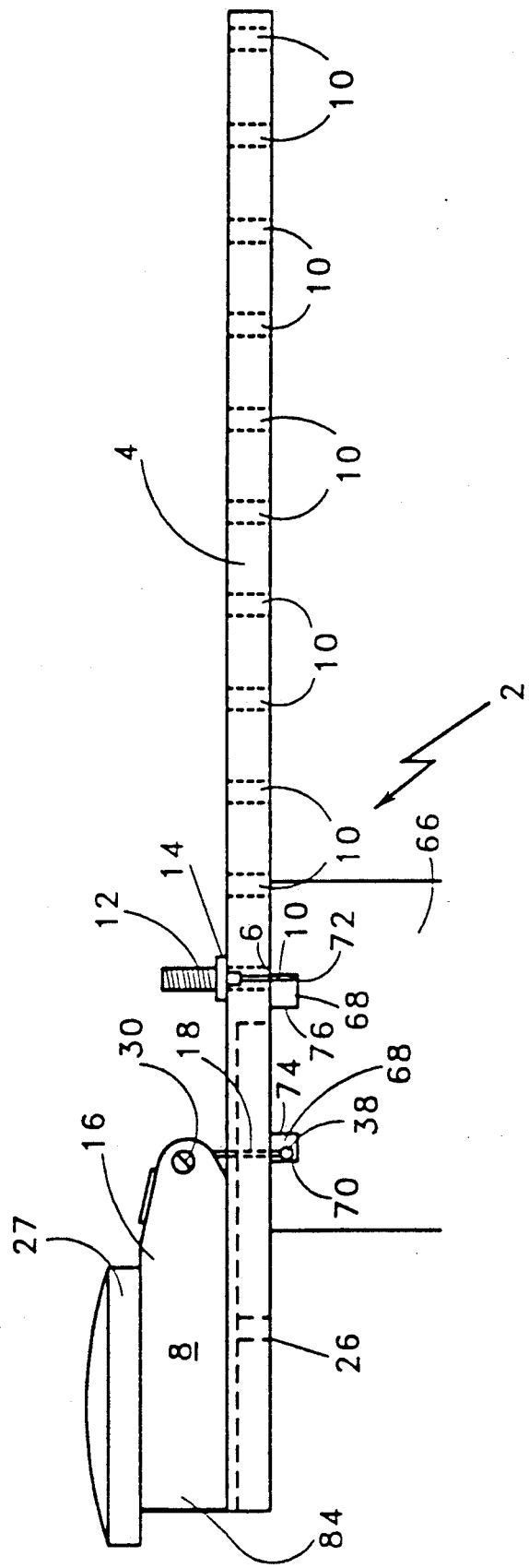
FIG. 7 is a side elevational view of the present invention shown positioned to measure an outer dimension of a shallow groove.

FIG. 7 shows a method of using measuring device 2 when used to compare the outer diameter of O-ring groove 68 of object 66 with respect to an inner dimension of an object, such as object 54 of FIG. 5. In this case, measuring device 2 would be calibrated as described above with respect to the inner distance between two points on object 54. Then, that measured inner dimension would be used to measure the deviation, if any, of the outer diameter of O-ring groove 68 by placing tip 38 in contact with surface 70 of object 66 and stop 6 in contact with surface 72, as shown in FIG. 7. The deviation of the outer diameter of O-ring groove 68 may then be determined with reference to scale 20 as described above.

In an alternate arrangement, (not shown) measuring device 2 may be employed to determine the deviation of the inner diameter of O-ring groove 68 with respect to an outer dimension of a reference object, such as object 42 of FIG. 3. In this case, measuring device 2 would, first, be calibrated as described above with respect to the outer distance between two points on object 42. Then, measuring device 2 would be employed to measure the deviation, if any, in the distance between surfaces 74 and 76 of the inner diameter of O-ring groove 68 with that of the reference object by placing tip 38 in contact with surface 74 and stop 6 in contact with surface 76. The deviation of the inner diameter of O-ring groove 68 may then be determined with reference to scale 20 as described above.

In all cases, since lever 18 is spring biased relative to stop 6, it is desirable that the spring biasing action of lever 18 be advantageously employed to press tip 18 and stop 6 in contact with the surface of the object being measured. That is facilitated by the proper positioning of stop 6 on base 4.

When device 2 is used to compare outer dimensions of two objects, stop 6 is positioned so that the distance between stop 6 and tip 38, when lever 18 is in its neutral position, is less than the each of the outer dimensions of the object. In that case, lever 18 must be moved against its spring biased force, in the direction of arrow 40, to further separate tip 38 from stop 6 when the surfaces of the objects are positioned therebetween. The biasing force against lever 18 will the return lever 18 toward its neutral position, in the direction opposite arrow 40, until tip 38 and stop 6 are in contact with their respective surfaces on the object. The biasing force on lever 18, thus, ensures tight contact between tip 38 and stop 6 with their respective surfaces.

When device 2 is used to compare inner dimensions of two objects, stop 6 is positioned so that the distance between stop 6 and tip 38, when lever 18 is in its neutral position, is greater than each of the inner dimensions. In that case, lever 18 must be moved against its spring biased force, in the direction opposite arrow 40, to reduce the separation between tip 38 and stop 6 when the objects are positioned therebetween. The biasing force against lever 18 will then return lever 18 toward its neutral position, in the direction of arrow 40, until tip 38 and stop 6 are in contact with their respective surfaces on the object. The biasing force on lever 18, thus, ensures tight contact between tip 38 and stop 6 with their respective surfaces.

When device 2 is used to compare an outer dimension of one object with an inner dimension of another object, stop 6 is positioned so that the distance between stop 6 and tip 38, when lever 18 is in its neutral position, is less than the outer dimension of the object whose outer dimension is being measured and greater than the inner dimension of the object whose inner dimension is being measured. In that case, lever 18 must be moved against the spring biasing force, in the direction of arrow 40, to further separate tip 38 from stop 6 when the object whose outer dimension is being measured is positioned therebetween and moved against the spring biasing force, in the direction opposite arrow 40, to reduce the separation between tip 38 and stop 6 when the object whose inner dimension is being measured is positioned therebetween. In both cases, the biasing force against lever 18 will return lever 18 toward its neutral position until tip 38 and stop 6 are in contact with their respective surfaces on each object. The biasing force on lever 18, thus, ensures tight contact between tip 38 and stop 6 and their respective surfaces.

Figure 8:
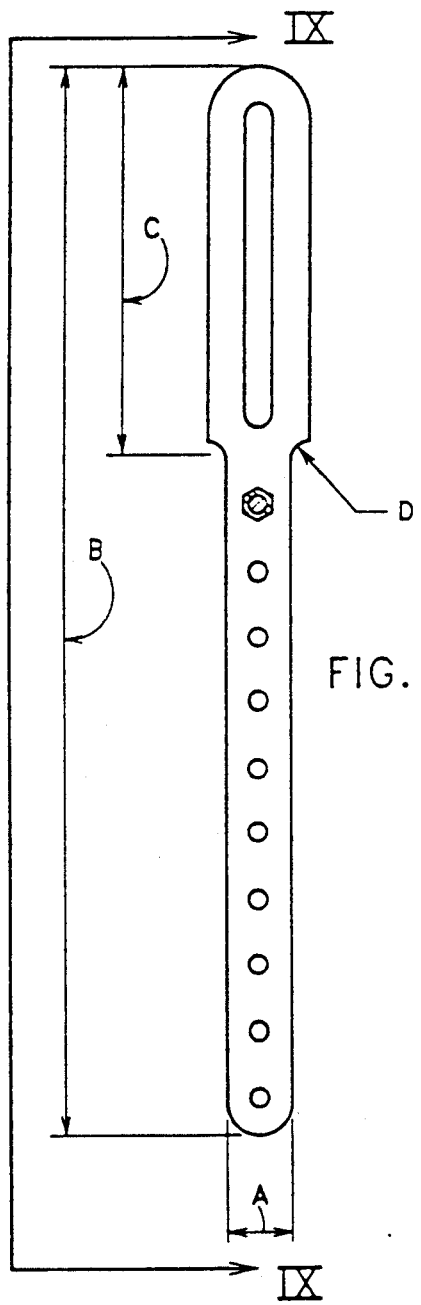
FIG. 8 is a front elevational view of the base member of the present invention.
Figure 9:
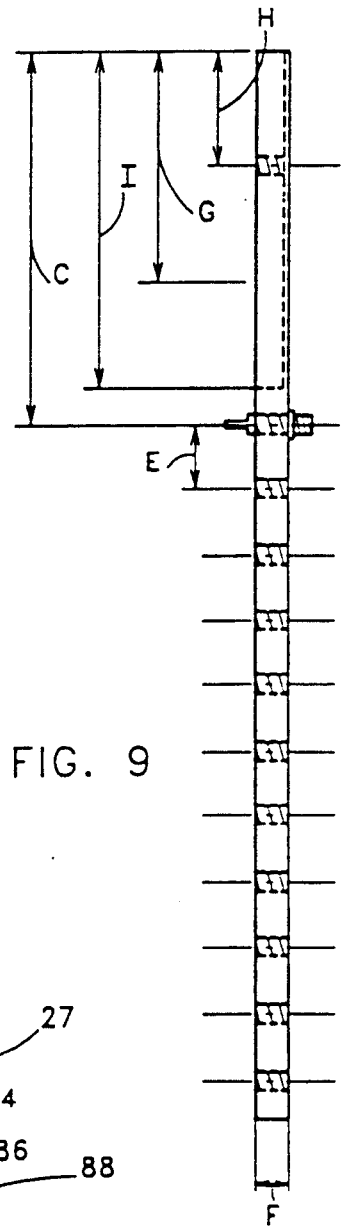
FIG. 9 is a side elevational view of the base of the present invention taken along line IX—IX of FIG. 8.

The present invention may, preferably, be fabricated in various sizes depending on the particular application for which it is to be used. The following table shows typical dimensions for two preferred sizes, with reference to FIGS. 8 and 9.

| Dimension | Embodiment No. 1 | Embodiment No. 2 |
|---|---|---|
| A | 0.500 inches (in.) | 0.500 in. |
| B | 8.125 in. | 14.125 in. |
| C | 3.00 in. | 9.00 in. |
| D | 0.25 in. radius | 0.25 in. radius |
| E | 0.500 in. | 0.500 in. |
| F | 0.25 in. | 0.25 in. |
| G | 1.75 in. | 1.75 in. |
| H | 1.00 in. | 1.00 in. |
| I | 2.75 in. | 2.75 in. |

Embodiment no. 1 is useful for measuring diameters in the range of 0 to 6 inches and bores in the range of 0.5 inches to 6.5 inches, while embodiment no. 2 is useful for measuring diameters in the range of 6 inches to 12 inches and bores in the range of 6.5 inches to 12 inches.

Screw 26 may be a 10-32×0.180 inch Allen set screw, stop 6 may be a 10-32×0.75 inch Allen set screw and nut 14 may be a 10-32 lock nut. Also, holes 10 may be 10-32 tapped holes when using a 10-32×0.75 Allen set screw for stop 6.

Figure 10:
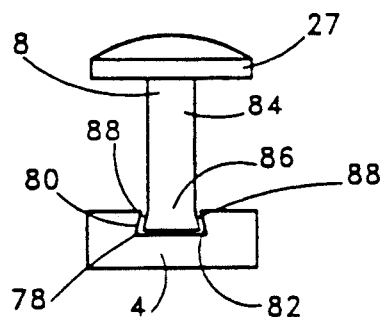
FIG. 10 is a top elevational view of the present invention taken along line X—X of FIG. 1.

FIG. 10 shows how gauge 8 may be slidably connected to base 4. Base 4 may include groove 78 having angled sidewalls 80 and 82. Case 84 of gauge 8 may include connecting piece 86 that has shoulder 88 that cooperates with sidewalls 80 and 82 to slidably attach gauge 8 to base 4. With this configuration, groove 78 and connecting piece 86 act to cooperate in somewhat of a tongue-in-groove manner.

An important aspect, of the present invention, are the dimension of tip 38, of lever 18, and stop 6. Tip 38 of lever 18 is configured to have a diameter, or width that is less than one-eighth of an inch and stop 6 is configured to have a diameter, or width that is about one-eighth of an inch. These dimensions facilitate the measurement of bores and diameters as short as 0.6 inches in length, or depth. Thus, the present invention facilitates the measurement of the inner and outer diameters of O-ring grooves that is not possible with devices such as dial calipers, micrometers, telescoping bore gauges, or other standard measuring devices, since the anvils are, generally, too large to fit in a shallow O-ring or short-bore.

While O-ring grooves could be measured with a height set machine, that would necessitate the transporting of the object to be measured to the height set machine itself since height set machines are not readily portable. Because of the size and portability of the present invention, it may be kept at a work location, thereby facilitating the taking of measurements without requiring movement of the workpiece away from the workstation.

It may be appreciated, therefore, that the present invention provides a convenient apparatus and method for comparing the dimensions between pairs of points on two objects. The invention is particularly suited for measuring distances in narrow or shallow openings or for shallow shoulder objects such as O-ring grooves and short bores. The apparatus is relatively easy to construct and use and may be employed directly at a work location, thereby facilitating completion of work on a workpiece without the necessity of moving the workpiece to another machine, such as a height set machine, to do such measurements.

All, or substantially all, of the components and methods of the various embodiments may be used with at least one embodiment or all of the embodiments described herein.

All of the patents, patent applications, and publications recited herein, if any, are hereby incorporated by reference as if set forth in their entirety herein.

The details in the patents, patent applications, and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. Apparatus for providing a comparison of the distance between two points on a reference object with the distance between two points on a workpiece, said apparatus comprising:

a base defining an axis and a groove;
a stop connected to said base;
a gauge including a tongue;
said groove and said tongue cooperating to attach said gauge to said base;
said gauge having a lever being movable toward and away from said stop thereby defining a changeable distance therebetween;
said gauge having an indicator connected to said lever;
said indicator begin movable in response to movement of said lever to a position relative to said axis of said base corresponding to said distance between said lever and said stop;
said gauge having a scale with indices thereon;
said scale being movable relative to said indicator to a preselected position;
said lever being positioned a reference distance from said stop when said lever is moved to a first point on the reference object and said stop is positioned at a second point on the reference object, said lever thereby moving said indicator to a reference position relative to said axis of said base;
said scale being movable to position a reference index of said indices adjacent said indicator when said indicator assumes said reference position; and
said lever being positioned a comparison distance from said stop when said lever is moved to a first point on the workpiece and said stop is positioned at a second point on the workpiece, said lever thereby moving said indicator relative to said axis of said base adjacent a comparison index of said indices when said lever is positioned a comparison distance from said stop where a comparison of said comparison index to said reference index provides an indication of the existence of a deviation between said reference distance and said comparison distance.

2. The apparatus of claim 1, further including a plurality of positioning means for positioning said stop at one of a plurality of positions on said base.

3. The apparatus of claim 2, wherein:
each said positioning means includes threads;
said stop includes threads; and
said threads of each said positioning means and said threads of said stop cooperate to connect said stop to said base.

4. The apparatus of claim 3 wherein:
said lever includes an end portion;
said end portion of said lever defines a first dimension; and
said first dimension is less than one-eighth of an inch.

5. The apparatus of claim 4, wherein:
said stop includes an end portion;
said end portion of said stop defines a second dimension; and
said second dimension is about one-eighth of an inch.

6. The apparatus of claim 5, wherein each said positioning means defines a threaded hole.

7. Apparatus for providing a comparison of the distance between two points on a reference object with the distance between two points on a workpiece, said apparatus comprising:
a base defining an axis;
a stop connected to said base;
a gauge connected to said base;
said gauge having a lever being movable toward and way from said stop thereby defining a changeable distance therebetween;
said gauge having an indicator connected to said lever;
said indicator being movable in response to movement of said lever to a position relative to said axis of said base corresponding to said distance between said lever and said stop;
said gauge having a scale with indices thereon;
said scale being movable relative to said indicator to a preselected position;
said lever being positioned a reference distance from said stop when said lever is moved to a first point on the reference object and said stop is positioned at a second point on the reference object, said lever thereby moving said indicator to a reference position relative to said axis of said base;
said scale being movable to position a reference index of said indices adjacent said indicator when said indicator assumes said reference position;
said lever being positioned a comparison distance from said stop when said lever is moved to a first point on the workpiece and said stop is positioned at a second pin ton the workpiece, said lever thereby moving said indicator relative to said axis of said base adjacent a comparison index of said indices when said lever is positioned a comparison distance from said stop where a comparison of said comparison index to said reference index provides an indication of the existence of a deviation between said reference distance and said comparison distance;
a plurality of positioning means for positioning said stop at one of a plurality of positions on said base;
said base including a groove;
said gauge including a tongue; and
said groove and said tongue cooperating to attach said gauge to said base.

8. The apparatus of claim 7, wherein:
each said positioning means includes threads;
said stop includes threads; and
said threads of each said positioning means and said threads of said stop cooperate to connect said stop to said base.

9. The apparatus of claim 8, wherein:
said lever includes an end portion;
said end portion of said lever defines a first dimension; and
said first dimension is less than one-eighth of an inch.

10. The apparatus of claim 9, wherein:
said stop includes an end portion;
said end portion of said stop defines a second dimension; and
said second dimension is about one-eighth of an inch.

11. The apparatus of claim 10, wherein each said positioning means defines a threaded hole.

12. Apparatus for determining the deviation of the distance between two points on a first object and the distance between two points on a second object, said apparatus comprising:
measuring means for measuring the distance between two points on an object;
said measuring means having an indicator being movable relative to the distance between two points on an object when the object is measured;
said measuring means having a scale with indices thereon;
said scale being movable relative to said indicator to a preselected position;
said measuring means including abase;
said base defining a groove;
said measuring means including a tongue;
said groove and said tongue cooperating to attach said measuring means to said base;
said distance between the two points on the first object being measured by said measuring means to move said indicator relative to said distance between the two points on the first object;
said scale being movable to position a reference index of said indices adjacent said indicator when the distance between the two points on the first object is measured by said measuring means; and
said distance between the two points on the second object being measured by said measuring means to move said indicator adjacent a comparison index on said scale relative to said distance between the two points on the second object where a comparison of said comparison index to said reference index provides an indication of the existence of a deviation of the distance between the two points on the first object and the distance between the two points on the second object.

13. The apparatus of claim 12, wherein said measuring means includes:
a gauge mounted on said base; and
a stop mounted on said base.

14. The apparatus of claim 13, wherein:
said gauge includes a movable member positioned in spaced apart relation to said stop; and
the distance between said movable member and said stop corresponds to the distance between the two points on an object when one point on the object is in contact with said movable member and the other point on the object is in contact with said stop.

15. The apparatus of claim 14, wherein:
said movable member includes an end portion;

said end portion of said movable member defines a first dimension;

said first dimension is less than one-eighth of an inch;

said stop includes an end portion;

said end portion of said stop defines a second dimension; and said second dimension is about one-eighth of an inch.

16. The apparatus of claim 15, further including a plurality of positioning means for mounting said stop at one of a plurality of positions on said base.

17. The apparatus of claim 16, wherein:
each said positioning means includes threads;
said stop includes threads; and
said threads of each said positioning means and said threads of said stop cooperate to mount said stop to said base.

18. The apparatus of claim 17, wherein each said positioning means defines a threaded hole.

* * * * *

UNITED STATES PATENT AND TRADEMARK OFFICE
CERTIFICATE OF CORRECTION

PATENT NO. : 5,074,054

DATED : December 24, 1991

INVENTOR(S) : Steven BOWER

It is certified that error appears in the above-identified patent and that said Letters Patent is hereby corrected as shown below:

In column 1, line 34, after 'such', insert --as--.
In column 2, line 54, after 'or', insert --a--.

In column 5, line 35, after 'to', delete "$5 \times 10^{\cdot 3}$" and insert --$5 \times 10^{-3}$--.

In column 9, line 41, delete "dimension" and insert --dimensions--.

Column 11    line 30  delete "way" and insert --away--.
Column 11    line 53, after 'second', delete "pin ton" and insert --point on--.
Column 12, line 31, after 'including', delete "abase" and insert --a base--.

Signed and Sealed this

Twenty-seventh Day of April, 1993

*Attest:*

MICHAEL K. KIRK

*Attesting Officer*     *Acting Commissioner of Patents and Trademarks*